May 21, 1940.   N. AHLMANN   2,201,552
APPARATUS FOR TREATING PULVERULENT MATERIALS
Filed May 15, 1936
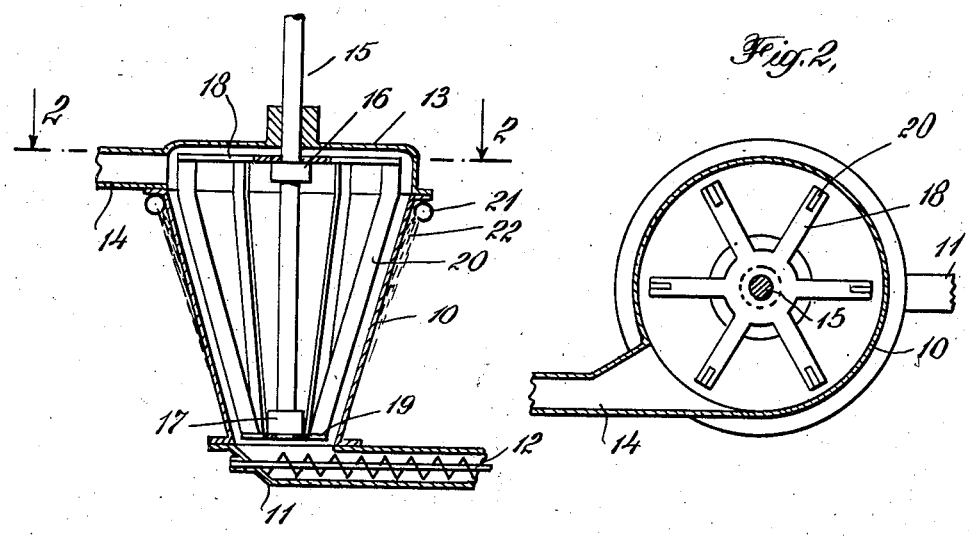
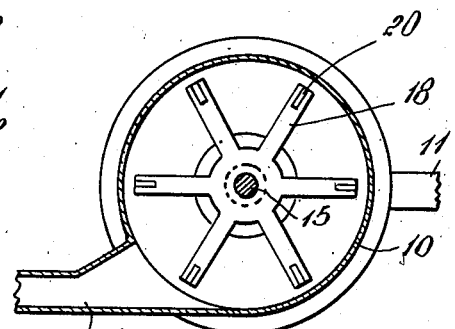
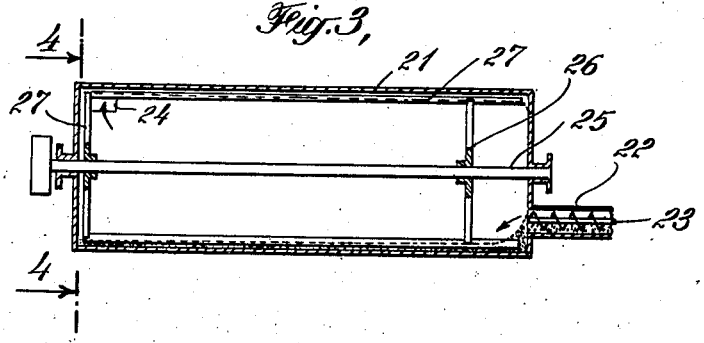
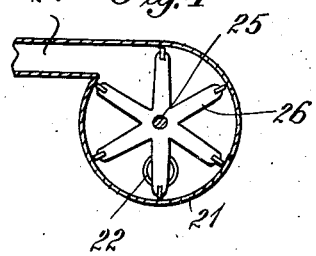
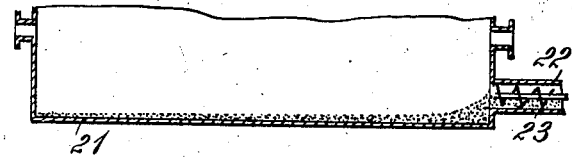
INVENTOR
Nikolai Ahlmann
BY
Pennie Davis Marvin Edmonds
ATTORNEYS Patented May 21, 1940

2,201,552

UNITED STATES PATENT OFFICE 2,201,552

APPARATUS FOR TREATING PULVERULENT MATERIALS

Nikolai Ahlmann, Copenhagen, Denmark, assignor to F. L. Smidth & Company, New York, N. Y., a corporation of New Jersey Application May 15, 1936, Serial No. 79,837
In Great Britain May 31, 1935

1 Claim. (Cl. 257—112)

This invention relates to the treatment of pulverulent materials to alter the heat content thereof for the purpose of either heating or cooling the materials. More particularly, the invention relates to an apparatus by which such materials may be rapidly heated or cooled without loss of the materials and with control of the heat transfer resulting in the heating or cooling effect.

Heretofore, in order to heat or cool pulverulent materials, various expedients have been employed, as, for example, a current of air has been caused to sweep over the materials, or the materials have been charged in a thick layer in a container made of heat conducting material. Heat exchange is then caused to take place through the wall of the container, and, in some instances, it has been the practice to stir the materials slowly while they are undergoing treatment. These prior methods are not entirely satisfactory, since they require large heat exchange surfaces, and when an air current is caused to flow over the materials, it may take up and carry away dust, particularly, if the materials are in the form of a fine powder. The loss of materials as a result of their removal by the air current may be so pronounced in some instances as to necessitate the use of a dust precipitation plant for recovery of the materials, and this adds greatly to the cost of installation and operation of the equipment.

The present invention is directed to the provision of an apparatus which overcomes the objections to the prior practices, and, in accordance with the invention, the material is caused to move by centrifugal action in the form of a relatively thin layer along a helical path in contact with the inner face of a surface of revolution, and a medium of a temperature different from that of the material is maintained in contact with the outer face of said surface. In the movement of the material, it is propelled wholly by centrifugally acting mechanical means unassisted by gravity, and the action of the propelling mechanism is such as to cause the particles to form a thin layer in continuous contact with the surface of the container with the particles in the thin layer moving continuously relatively to one another. The material is not in contact with a body of air which is capable of carrying away dust particles, so that no dust losses occur, and since the relative movement of the particles in the layer brings all the particles into frequent contact with the heat conducting surface, there is a good heat exchange, because the transmission of heat is effected by direct contact, and not by conduction through a layer of the material itself. Also, since the material may be caused to move at a relatively high speed over the surface, which permits a high degree of heat transmission, the surface may be relatively small. At the same time, comparatively long contact between the particles and the surface is obtained, because the particles in the layer move along the surface in a helical path. The amount of heat transmitted to or from the material may then be controlled by controlling the rate of movement of the material along the surface.

The apparatus for practicing the new method may take various forms, and it includes a container having a wall of heat conducting material and of the shape of a surface of revolution. Thus, the wall may be of conical or cylindrical form and, for some purposes, it is preferable to employ a container having a conical heat conducting wall disposed with the axis of the cone vertical, and the small end down. Means are provided at one end of the wall for introducing material to be treated into the container, and within the container is a propelling mechanism for forcing the material along the wall in a helical path to a discharge port at the other end thereof. This propelling mechanism may conveniently consist of a rotary shaft with a plurality of vanes thereon, and in the case of a conical container, the shaft is mounted vertically so that the vanes force the material in an upward helical direction against the force of gravity to the outlet. Instead of being conical in form, the container may, if desired, be cylindrical, in which case, the container is so disposed that the axis of the container is horizontal, and the point of introduction of the material is at one end and near the bottom of the container, and the discharge port is at the other end and near the top of the container. With both constructions, a medium of a temperature different from that of the material undergoing treatment is maintained in contact with the outer surface of the container wall, and heat exchange takes place through the wall. In apparatus used for cooling pulverulent material, the medium employed may be water, which is discharged upon the outside of the container from suitable nozzles.

For a better understanding of the invention, reference may be had to the accompanying drawing, in which—

Figure 1 is a vertical sectional view through one form of apparatus suitable for the practice of the invention;

Figure 2 is a sectional view on the line 2—2 of Figure 1;

Figure 3 is a vertical longitudinal sectional view through another form of apparatus;

Figure 4 is a sectional view on the line 4—4 of Figure 3; and

Figure 5 is a fragmentary view similar to Figure 3 with certain parts of the apparatus removed.

Referring now to the drawing, the apparatus for cooling material, shown in Figures 1 and 2, comprises a conical metal container 10 disposed with its axis vertical and with its small end down. At the bottom of this container is a casing 11 opening into the container and containing a feed screw 12 of suitable construction. The top of the container is closed by a cover 13 provided with a tangentially disposed discharge port 14, and through the cover projects a rotary shaft or spindle 15 driven by any suitable means, not shown. A squirrel-cage beater having blades so separated that the material between them is exposed to the air in the middle part of the container is mounted on spindle 15 for rotation therewith. A beater of that character may comprise spiders 18 and 19 mounted on hubs 16 and 17 provided on the spindle 15 near the top and bottom of the container, respectively, and vanes or blades 20 mounted on the corresponding arms of the spiders 18 and 19 and lying close to the inner surface of the container and cover. Encircling the container near its upper end is a pipe 21 provided with a plurality of nozzles through which water is discharged against the outer surface of the container, as indicated at 22.

In the operation of the apparatus, the hot pulverulent material to be cooled is fed by the feed screw 12 into the bottom of the container. As the material builds up in the container, it is engaged by the blades 20 moving rapidly around in the container. The material struck by the blades is forced upwardly along the inner surface of the container wall along a helical path by the centrifugal action of the blades, the material forming a thin layer which is in continuous contact with the surface and in which the particles constantly move relatively to one another so that all the particles come repeatedly into contact with the surface. When the material in the layer reaches the inner surface of the cover, it has given up heat in an amount depending upon various factors, such as the length of its path along the wall, its speed along the path, the temperature differential between the material and cooling medium, etc. The cooled material is then discharged through the port 14.

The temperature of the material issuing from the container may be controlled in various ways, as, for example, by varying the speed at which the shaft 15 rotates, and varying the temperature of the medium in contact with the outer wall of the container and the rate at which the medium is supplied to the container wall. Also, the steepness of the slope of the inner wall of the container is a factor which has a bearing on the speed at which the material will be propelled through the container, and, in apparatus used for different purposes, containers of different geometrical forms may be employed.

In the apparatus illustrated in Figures 3, 4, and 5, the container 21 is of cylindrical form lying with its axis horizontal. At one end of the container near the bottom thereof is an inlet casing 22 containing a feed screw 23 and near the other end of the container in the cylindrical wall and near the top of the container is a tangentially disposed discharge port 24. A shaft 25 extends axially through the container and is mounted in suitable bearings in the end walls. This shaft carries spiders 26 and 27 and the corresponding arms of the spiders are connected by vanes or blades 27 which move close to the inner wall of the container as the shaft rotates.

In the operation of the apparatus shown in Figures 3 to 5, the material is delivered into the container by the feed screw just within the end wall of the container where it is struck by the blades 27 and caused to travel at high speed along a helical path toward the opposite end wall. In its travel, the material has the form of a thin layer in contact with the inner wall of the container, and the particles in the layer move relatively to one another so that the particles come repeatedly into contact with the container wall. This movement of the material is effected wholly by the centrifugal action of the propelling means described, and the material moves along its helical path in part against the force of gravity, until it is thrown out through the discharge port. Heat transfer is then effected by maintenance of a suitable medium of a temperature different from that of the material in contact with the outer wall of the container, as, for example, water may be discharged against the outer wall of the container by discharge pipes not shown.

With this form of the apparatus, the heat transfer effect is controlled by varying the rate of feed and the rate at which the blades 27 move about through the container. If the feed screw operates with a high delivery, the material is quickly picked up by the blades and is rapidly passed through the apparatus and discharged so that the rate of heat transfer is lower than if the material is fed slowly and moved slowly through the container.

It will be noted that in neither form of the apparatus is air excluded. The blades act on the material in the presence of air, some or all of which is fed in with the material by the feed screw. The blades not only impel the particles outwardly by centrifugal force, but they do so by a beating action which mixes the material with some of the air to lessen the density of the incoming material and render it more fluent so that it will be capable of moving easily over the inner surface of the container. To facilitate this beating and mixing action the layer of material is not closely confined at its side which faces the axis of the container, otherwise the action would be more in the nature of a conveying action with not sufficient opportunity afforded for lessening the density of the incoming material and maintaining it in a state of low density.

In the operation of both forms of the apparatus the material is fed to the container at a rate such that the volume of the material therein is relatively small with respect to the volume of the container.

Both forms of the apparatus are simple and inexpensive to construct and operate, they provide the desired heating or cooling effects which are subject to control, and they operate without dust losses. The invention thus accomplishes the desired purposes without the disadvantages of the prior devices.

The method and apparatus of the invention may be used for the treatment of pulverulent material of various kinds, an example of such use being the cooling of newly ground cement which is heated in the grinding operation. Other materials which may be treated include hydrated lime, which is heated in hydration, burned alumina, and the like.

I claim:

An apparatus for cooling pulverulent material, such as freshly ground cement, freshly hydrated lime, burned alumina, etc., which comprises a container having a heat-conductive wall defining a relatively large air space, the inner surface of said wall being generally frusto-conical and disposed with its axis vertical and its small end down, a cylindrical end section at the upper end of said wall having an outlet port therein, an outlet conduit leading from the port, means for introducing pulverulent material into the container near the lower end of said wall, a squirrel-cage beater mounted for rotation on the axis of the wall and having blades extending longitudinally of the wall and end section from a point near where the material is introduced to a point above the bottom of the outlet, the outer edges of the blades lying close to the inner surfaces of the wall and of the end section and said surfaces presenting a surface free from abrupt changes of direction from the point of introduction of the material to the outlet port, the blades operating to beat air into the material introduced into the container to render it fluent and to cause the material to move upwardly on the inner surfaces of said wall and end section along a helical path and in a thin layer in which the particles move relatively to one another, and means for causing a cooling medium to flow along the outer surface of said wall.

NIKOLAI AHLMANN.